United States Patent [19]

Müller et al.

[11] 4,314,544
[45] Feb. 9, 1982

[54] SOLAR COLLECTOR FOR A WINDOW FRAME

[75] Inventors: Gottfried Müller; Paul Hipp, both of Kolbingen, Fed. Rep. of Germany

[73] Assignee: Schako-Metallwarenfabrik Ferdinand Schad GmbH, Fed. Rep. of Germany

[21] Appl. No.: 37,023

[22] Filed: May 8, 1979

[30] Foreign Application Priority Data

May 13, 1978 [DE] Fed. Rep. of Germany ....... 2821165

[51] Int. Cl.³ ................................................ F24J 3/02
[52] U.S. Cl. ..................................... 126/417; 126/444; 126/445; 126/450; 165/53; 165/48 S
[58] Field of Search ............... 126/432, 448, 450, 442, 126/431, 432, 417; 165/48 S, 53

[56] References Cited

U.S. PATENT DOCUMENTS

| | | | |
|---|---|---|---|
| 1,873,854 | 8/1932 | Wheeler | 126/448 X |
| 2,998,006 | 8/1961 | Johnston | 126/448 X |
| 3,415,024 | 12/1968 | Kotlarz | 165/53 X |
| 3,863,621 | 2/1975 | Schoenfelder | 126/432 |
| 3,960,135 | 6/1976 | Angilletta | 126/450 |
| 3,986,491 | 10/1976 | O'Hanlon | 126/450 |
| 4,090,497 | 5/1978 | Kelly | 165/48 S |
| 4,092,979 | 6/1978 | Kotlarz | 126/438 X |
| 4,114,595 | 9/1978 | Barker | 126/450 X |
| 4,120,286 | 10/1978 | Farber | 126/444 X |
| 4,154,223 | 5/1979 | Löf | 126/450 |
| 4,155,346 | 5/1979 | Aresty | 126/445 X |

Primary Examiner—Larry Jones
Attorney, Agent, or Firm—Blair, Brown & Kreten

[57] ABSTRACT

A solar collector for use as or on the window frames of a building. In one application, the main window frame is a hollow channel open on the side facing away from the wall of the building and covered, for example, with glass or another transparent cover. Inside the channel are located passages or conduits through which a heat transfer medium, for example water, may be circulated to transfer heat from the channel. The solar collector according to the invention may also be attached subsequently to already existing window frames as well as to existing window sub-frames. The solar collector according to the invention may be so constructed as to blend with the architectural appearance of the building without detriment thereto.

6 Claims, 4 Drawing Figures

SOLAR COLLECTOR FOR A WINDOW FRAME

FIELD OF THE INVENTION

The invention relates to a window for use in a building, including a solar collector frame and at least one fixed or openable framed leaf.

BACKGROUND OF THE INVENTION

It has become the practice in recent times to exploit solar radiation for the purpose of collecting energy for heating spaces and water supplies. Solar collectors of various types of construction are known. In general, these collectors are included in the roof surfaces of the buildings. However, rules and restrictions in force in various municipalities prevent the installation of solar roof collectors. In other cases such collectors might detract from the architectural appearance of the buildings.

It is also known in the art to install solar collectors on the walls of buildings which have southern exposure, i.e., at vertical surfaces. Such solar collectors are generally useful only for commercial and industrial applications for aesthetic reasons.

OBJECT AND SUMMARY OF THE INVENTION

It is thus a principal object of the present invention to provide a window for a building or the like in which heat is collected from the solar radiation in a relatively simple manner without adversely affecting the architectural appearance of the building.

This object is attained according to the invention by providing a window in which the window frame and/or the frame of the window leaf are constructed so as to constitute solar collectors.

In one preferred embodiment of the invention, the window frame has a U-profile which is open toward the outside of the building and which is covered on that side by a surface which is transparent to thermal radiation. It is a feature of the invention that any and all of the window frames of a building, especially the numerous frames in office buildings and highrise residential buildings can be used as solar collector surfaces. If some of the windows have partially or completely immovable panes, the frames of the fixed panes can also be used as collector surfaces. The individual surfaces of an entire building thus provide a collector surface which can be quite large.

By constrast to known roof collectors, the solar collectors according to the invention are independent of the style of architecture of the building and do not affect the external appearance thereof. The solar collectors according to the invention thus neither change the appearance of the building in which they are installed or the overall cityscape in which the building stands.

According to the invention, the solar collectors are preferably constructed in the form of flat, rectangular U-profile channels in which are disposed pipes for carrying the heat transfer medium. The open side of the profiled channel is provided with a cover which permits the passage of heat from solar radiation.

The solar collectors according to the invention are so shaped as to serve as window frames for either openable or fixed window panes. Suitably, the window frame and the collector housing can be a structure having a U-shaped profile and made of metal, preferably aluminum, but it may also be constructed of wood or wood with an aluminum liner. The material and detailed construction of the window frame would depend somewhat on the architectural appearance of the window which it is to be a part of. The solar collecting window frame according to the invention does not affect the overall dimensions of the window nor the depth of installation of the window frame in the wall of the building.

It is also possible within the scope of the invention to construct the solar collectors as flat, rectangular U-profiled channels with internal conduits and to mount these channels at the exterior of known window frames. Such a construction brings the disadvantage that the depth of installation of the window is somewhat increased. But, an advantage of this construction is that the solar collectors may be attached to already installed window frames and do not serve any load-bearing function in the construction of the window. Accordingly, the requirements of mechanical strength for such a collector housing are substantially lower, making their costs of construction correspondingly less. It is also advantageous and possible to construct the U-profiled collector housing from a weather-resistant plastic material.

A principal advantage of the solar collectors according to the invention over known collectors is that a large number of these collectors may be distributed over the entire side of the building. These collectors may be separated into common circuits supplying the hot water for different floors for example. Such an arrangement permits separate supply of hot water for the apartments in a building occupied by several parties. Such an arrangement is also advantageous for the retrofitting of the solar collectors of the invention because it requires no penetration of ceiling and floor surfaces which is normally required when roof collectors are installed in buildings.

The pipes or conduits which carry the heat transfer medium within the U-profiled collectors can be of various construction. The conduits can be pipes or tubes which run the length of the channel or else the channel may be separated by longitudinal walls into individual passages. The path of the heat transfer fluid through the channels may be increased by disposing within the channel transverse walls which force the medium to meander through the channel and increase its total length of passage. Any one or a plurality of these possibilities may be used depending basically on the cost of manufacture, the desired throughput of heat transfer medium, the necessary flow period and the average solar irradiation as well as other engineering parameters.

In other aspects, the solar collectors of the invention may be used for the same purpose and in the same manner to collect energy as is the case for known collectors. For example, the collectors may carry water as the heat transfer medium and this water may be used immediately to feed a storage container or may be used as hot water in a hot water line. Depending on the geographical location, solar collectors are normally supplemented by known and customary coal, oil or gas-fired heaters while a thermostatically controlled switch causes a switchover from solar heating to conventional heating.

The invention will be better understood and further advantages will become apparent from a detailed description taken in conjunction with the drawings.

DESCRIPTION OF THE PREFERRED EMBODIMENT

The embodiment described is a solar collector attached to the exterior of a known window frame.

Figure 1:
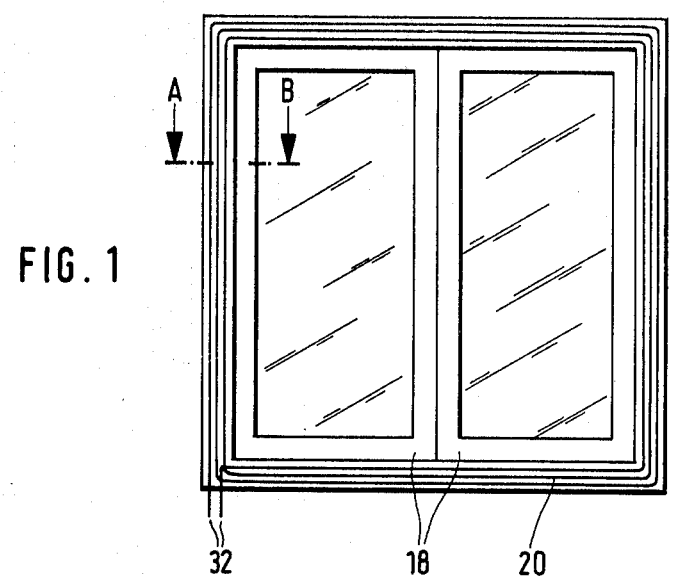
FIG. 1 is an external front elevational view of a solar collector for a window frame according to the invention.

A wall 10 of a building has an opening in which is inserted a window frame 14 by known means, for example mortar. The window frame may be constructed of wood, light metal or the like. The window frame 14 holds leaves or panes which in the example shown are joined permanently in an interior frame 16 and external frame 18. A solar collector 20 is attached to the open exterior surface of the window frame 14. The solar collector 20 includes a housing consisting substantially of a flat, rectangular channel 22 having a U-shaped cross section. The width of the channel 22 corresponds to the width of the exposed surface of the window frame 14 so as to make optimum use of the available area. As will be seen from FIG. 1, the collector surface extends around the entire periphery of the window frame 14. The choice of material for the channel 22 is made depending on several conditions. These conditions are the desired weather-resistance, the degree of adaptation to the overall architecture of the building, the cost of material, etc. Depending on these conditions and other considerations, the material of construction may be wood, light metal, plastic or the like.

The side of the U-profiled channel 22 remote from the wall of the building is closed by a cover 24. The choice of material for the cover 24 is also based on a number of conditions. Among these are the required transparency of the material to the heating rays of the sun and a high degree of adaptation of the material to the appearance and architecture of the building. Preferably, the material of the cover 24 is glass which may be tinted to suit the taste and style of the building. The tinting may also be based on considerations of selective admission of radiation.

The collector housing formed of the U-profiled channel 22 and the cover 24 houses and contains conduits 26 which may be tubes or pipes that extend in the longitudinal direction of the channel 22. A number of these conduits may be disposed in parallel to one another in the longitudinal direction of the channel. As indicated schematically in FIG. 1, inlet and outlet means 32 carry the heat transfer medium to and from the conduits 26. Preferably and normally, the heat transfer medium is water which is fed to a utility water container or a water heater, after passage through the adjacent lines 26 either in parallel or in series.

Figure 2:
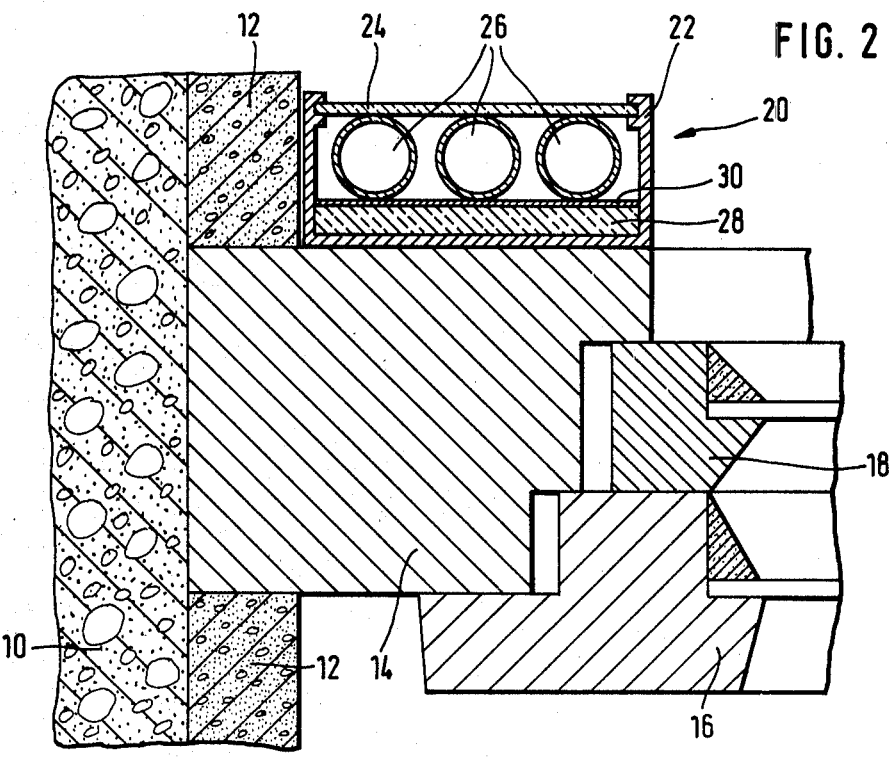
FIG. 2 is a section through FIG. 1 along the line A–B.

Advantageously, the U-profiled channel 22 is equipped with a heat-insulating cladding 28 which is shown in FIG. 2 to be applied only to the base of the channel. The insulating cladding may also be applied to the side walls of the channel, but the relatively low height of the side walls does not involve a substantial heat loss while the presence of insulation on the side walls would reduce the effective collector surface.

Advantageously, the interior surfaces of the channel 22 and especially the bottom which carries the insulating layer 28 are further covered with a reflecting coating 30, for example a reflecting metal or plastic foil.

If one or more of the various leaves or panes of the window are fixed, the exterior surface of the frame of such a fixed pane can also be equipped with a solar collector 20 which further increases the available collector surface.

Figure 3:
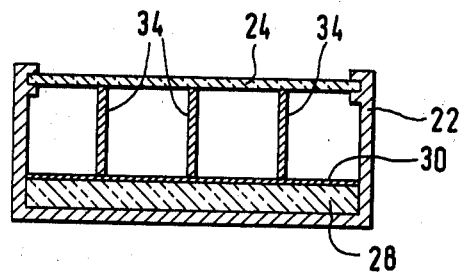
FIG. 3 is a sectional view of another embodiment of the invention.
Figure 4:
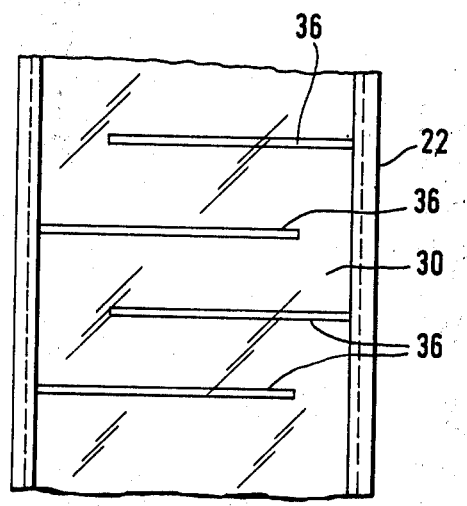
FIG. 4 is a sectional view of still another embodiment of the invention.

In the embodiment of FIG. 3, shown in transverse cross section, the interior of the channel 22 is provided with a plurality of internal longitudinal passages for conducting the heat transfer medium flowing within the channel. These passages are provided by transversely spaced partitions 34 which sub-divide the channel interior into such longitudinally extending passages. In the embodiment of FIG. 4, there is shown a plan view of a portion of a solar collector installed on the window frame 14 by means of which a meandering flow path for the heat transfer medium is created. Such a meandering flow path is provided by longitudinally spaced, transverse walls 36 which protrude in opposite directions in an alternating manner from both sides of the channel 22 into the channel interior.

The foregoing description relates to a preferred exemplary embodiment of the invention and other embodiments and variants are possible without departing from the scope of the invention.

We claim:

1. A solar collector for a window frame having a pane for installation on a building or the like comprising, in combination:
   a window frame having a substantially flat exterior surface of a specific width,
   a channel of U-shaped cross section having a base mounted on said window frame exterior surface having a width less than or equal to said specific width and extending along the majority of the total area of said flat exterior surface,
   said channel having an interior and an outwardly opening side facing away from the exterior of the building in which said window frame is installed,
   a cover transparent to solar radiation disposed within said channel outwardly opening side and
   at least one conduit in said channel interior for conducting a heat transfer medium therethrough for heating by said solar radiation wherein said at least one conduit is in the form of a plurality of tubes and including a thermally insulating cladding disposed on said base of said channel within said channel interior.

2. A solar collector for a window frame having a pane for installation on a building or the like comprising, in combination:
   a window frame having a substantially flat exterior surface of a specific width,
   a channel of U-shaped cross section having a base mounted on said window frame exterior surface having a width less than or equal to said specific width and extending along the majority of the total area of said flat exterior surface,
   said channel having an interior and an outwardly opening side facing away from the exterior of the building in which said window frame is installed,
   a cover transparent to solar radiation disposed within said channel outwardly opening side and at least one conduit in said channel interior for conducting a heat transfer medium therethrough for heating by said solar radiation wherein said at least one conduit is in the form of a plurality of internal longitudinal passages in said channel interior and including a thermally insulating cladding disposed on said base of said channel within said channel interior.

3. A solar collector for a window frame having a pane for installation on a building or the like comprising, in combination:
a window frame having a substantially flat exterior surface of a specific width,
a channel of U-shaped cross section having a base mounted on said window frame exterior surface having a width less than or equal to said specific width and extending along the majority of the total area of said flat exterior surface,
said channel having an interior and an outwardly opening side facing away from the exterior of the building in which said window frame is installed,
a cover transparent to solar radiation disposed within said channel outwardly opening side and
at least one conduit in said channel interior for conducting a heat transfer medium therethrough for heating by said solar radiation wherein said at least one conduit is in the form of a passage which meanders in the interior of said channel and including a thermally insulating cladding disposed on said base of said channel within said channel interior.

4. A window according to claims 1, 2 or 3, wherein said channel is constructed of wood, metal, plastic, or a combination of wood and metal.

5. A window according to claims 1, 2 or 3, wherein said cover is formed of glass.

6. A window according to claims 1, 2 or 3 wherein the inner wall of said channel is provided with a coating which reflects radiation.

* * * * *